June 12, 1951 V. G. WILLIAMS 2,556,383
TAGGING DEVICE
Filed Dec. 19, 1947 7 Sheets-Sheet 1
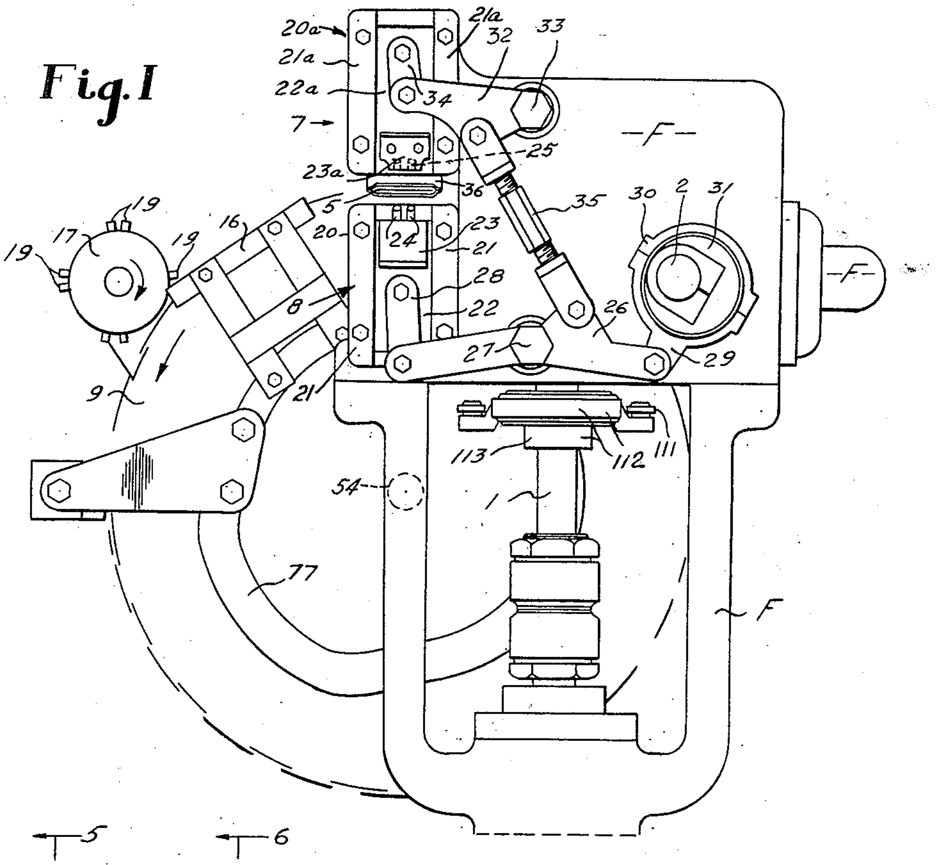
Fig. I
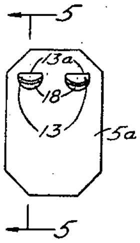
Fig. 3
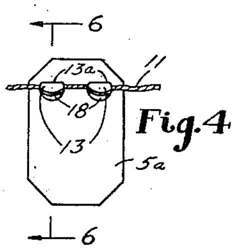
Fig. 4
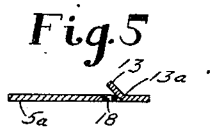
Fig. 5
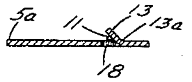
Fig. 6
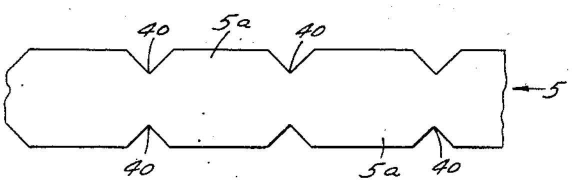
Fig. 2
Inventor:
V.G. WILLIAMS
by
Leon Arthurs
Attorney June 12, 1951 V. G. WILLIAMS 2,556,383

TAGGING DEVICE

Filed Dec. 19, 1947 7 Sheets-Sheet 2

Inventor
V.G. WILLIAMS
by
Leon Arthurs
Attorney

June 12, 1951 V. G. WILLIAMS 2,556,383

TAGGING DEVICE

Filed Dec. 19, 1947 7 Sheets-Sheet 3

Inventor
V.G. WILLIAMS
by
Leon Arthurs
Attorney

Inventor
V.G. WILLIAMS
by
Leon Arthurs
Attorney

June 12, 1951 | V. G. WILLIAMS | 2,556,383

TAGGING DEVICE

Filed Dec. 19, 1947 | 7 Sheets-Sheet 5

Inventor:
V.G. WILLIAMS
by
Leon Arthurs
ATTORNEY

June 12, 1951 V. G. WILLIAMS 2,556,383

TAGGING DEVICE

Filed Dec. 19, 1947 7 Sheets-Sheet 6

Inventor:
V.G. WILLIAMS
by
Leon Arthurs
Attorney

June 12, 1951
V. G. WILLIAMS
2,556,383
TAGGING DEVICE
Filed Dec. 19, 1947
7 Sheets-Sheet 7

Inventor:
V.G. WILLIAMS
by
Leon Arthurs
Attorney

Patented June 12, 1951

2,556,383

UNITED STATES PATENT OFFICE 2,556,383

TAGGING DEVICE

Victor George Williams, Toronto, Ontario, Canada, assignor, by mesne assignments, to Delamere & Williams Company, Limited, Toronto, Ontario, Canada Application December 19, 1947, Serial No. 792,823

10 Claims. (Cl. 93—91)

Figure 7:
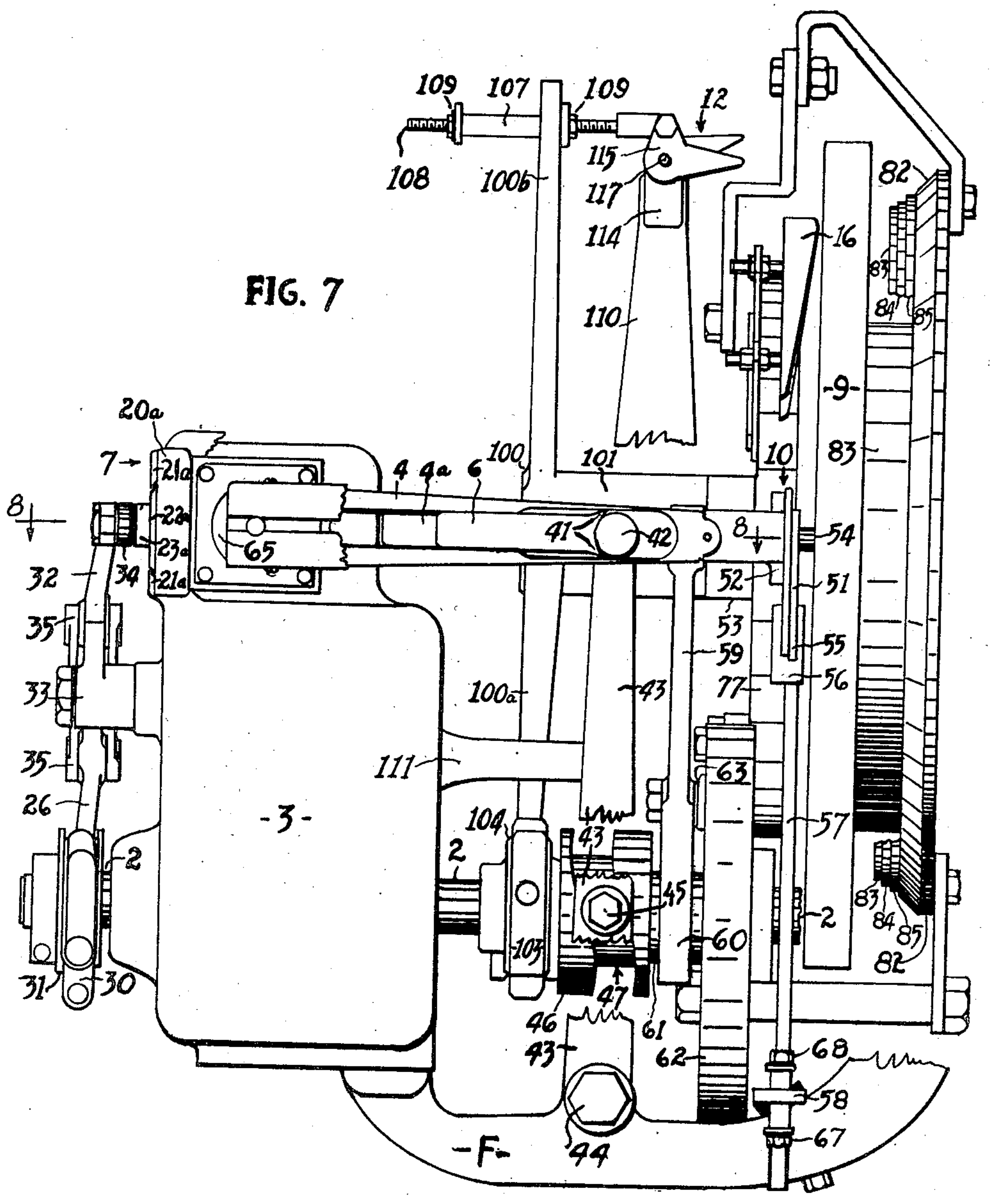

The instant invention relates to new and useful improvements in the method and mechanism for applying tags to packages.

A type of package specifically, but not restrictively, contemplated by the invention is the well-known tea-bag which comprises a thermo-adhesively sealed pouch of permeable material provided with a string handle terminating in a printed cardboard tag. Such packages are manufactured and charged by automatic packaging machines on the order disclosed by my prior U. S. Patent No. 2,351,382 and the instant mechanism is preferably intended as an adjunct to a basic machine of this character in which capacity it is adapted, inter alia, to provide a string handle tagged at one end and shaped and positioned at its other end for firm attachment to a package; these functions being performed in timed relation to the operation of the basic machine.

Broadly speaking, the superiority of the present invention over the prior art resides in the accelerated rate at which it enables the basic machine to deliver completed and efficiently tagged packages. In earlier apparatuses, intended for purposes analogous to that of the present improvement, a variety of methods for securing tags to packages were visualized. One popular method contemplated the relatively slow system of sewing the tag to the package with enough slack thread left therebetween to serve as a handle. Another somewhat faster method was to staple the strings to the tags which was at best, an uncertain method in which the strings were frequently but loosely secured. Moreover, the previous machines were not usually capable of performing all of the steps necessary to the complete preparation of a tagged string handle and to the delivery thereof to the basic machine for package attachment. In fact, in some instances the string handles had to be pre-cut to size and/or knotted; in others only individual tags were employable, while in a good many instances the tagged string handles were formed entirely apart from the package forming and tagging machine. It should additionally be observed that the conventional adhesive bonding of the string to the package along a substantially straight line was also found to be insecure.

The present invention seeks to overcome the foregoing stated and other unstated disadvantages of the prior art by providing process and mechanism for:

1. Positively securing a string to a cardboard tag in a novel, simple and efficient manner, 2. Adapting one end of the said string to form a firm and pull-resistant bond with the said package, 3. Forming the tag from tag material in roll or strip form, and the string handle from a continuous supply or spool thereof, and 4. Enabling an automatic packaging machine of the character previously described to deliver completely filled, closed and tagged packages much more rapidly than has heretofore been possible.

The above broad objectives of the invention are achieved by displacing one or more transversely aligned, peninsular flaps from a tag at the leading end of a connected series thereof; by interposing string chord-wise between the flaps and the tag material and across the orifices out of which the flaps were displaced; by replacing the said flaps into their orifices to pinch and retain the string; by cutting the tag from the series and the string adjacent thereto; by conveying the tag and its string to the open mouth of a package previously prepared and delivered by the basic machine; by looping or otherwise preparing the free string end and intruding it into the mouth of the said package which is then closed by the basic packaging machine in a known manner to both seal the said package and secure the string. It should be observed that the system of package closing visualized by this embodiment of the invention, is what is known in the art as the "Heat-Seal" process which is applicable to materials having thermo-plastic or thermo-adhesive characteristics or coatings.

Figure 8:
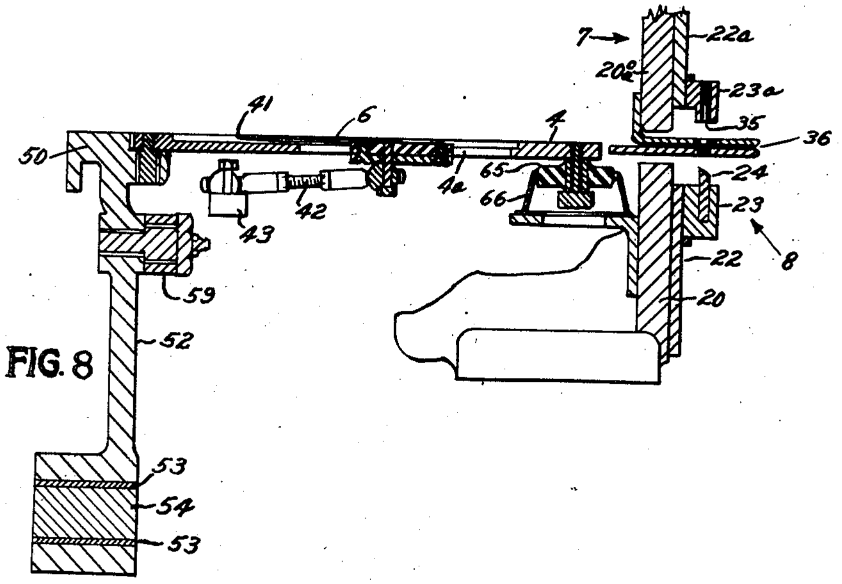
Figure 9:
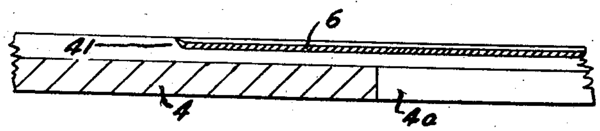
Figure 10:
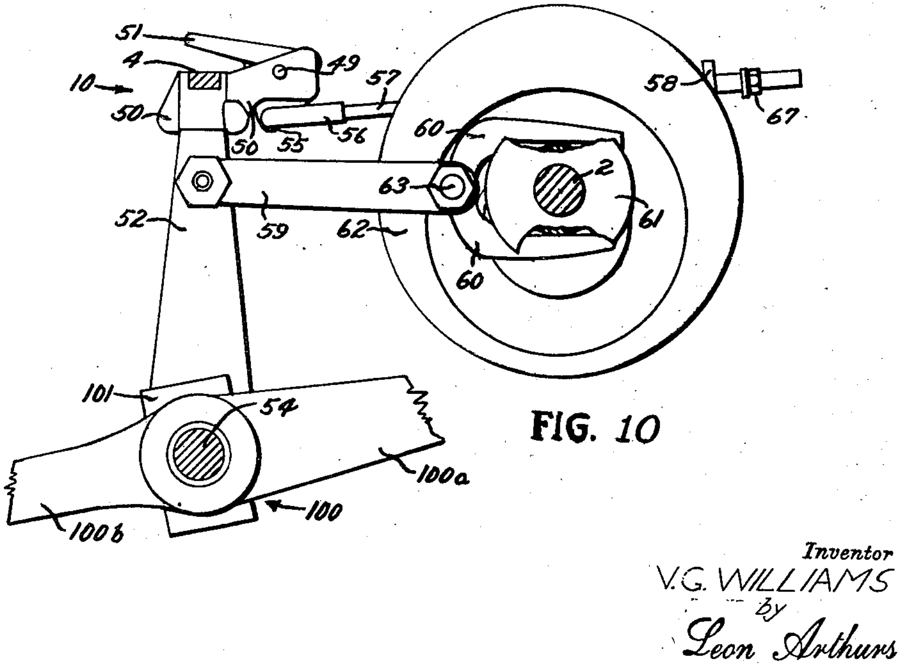
Figure 12:
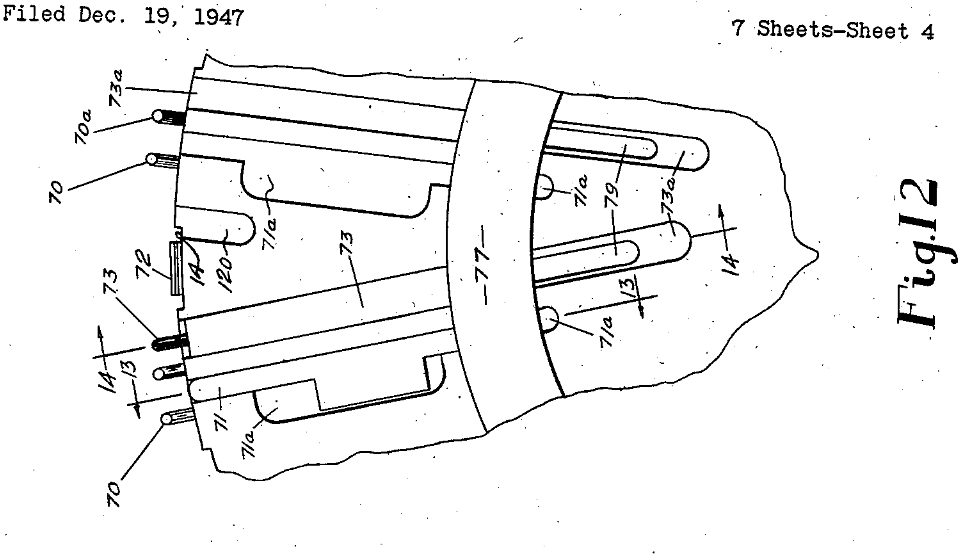
Figure 11:
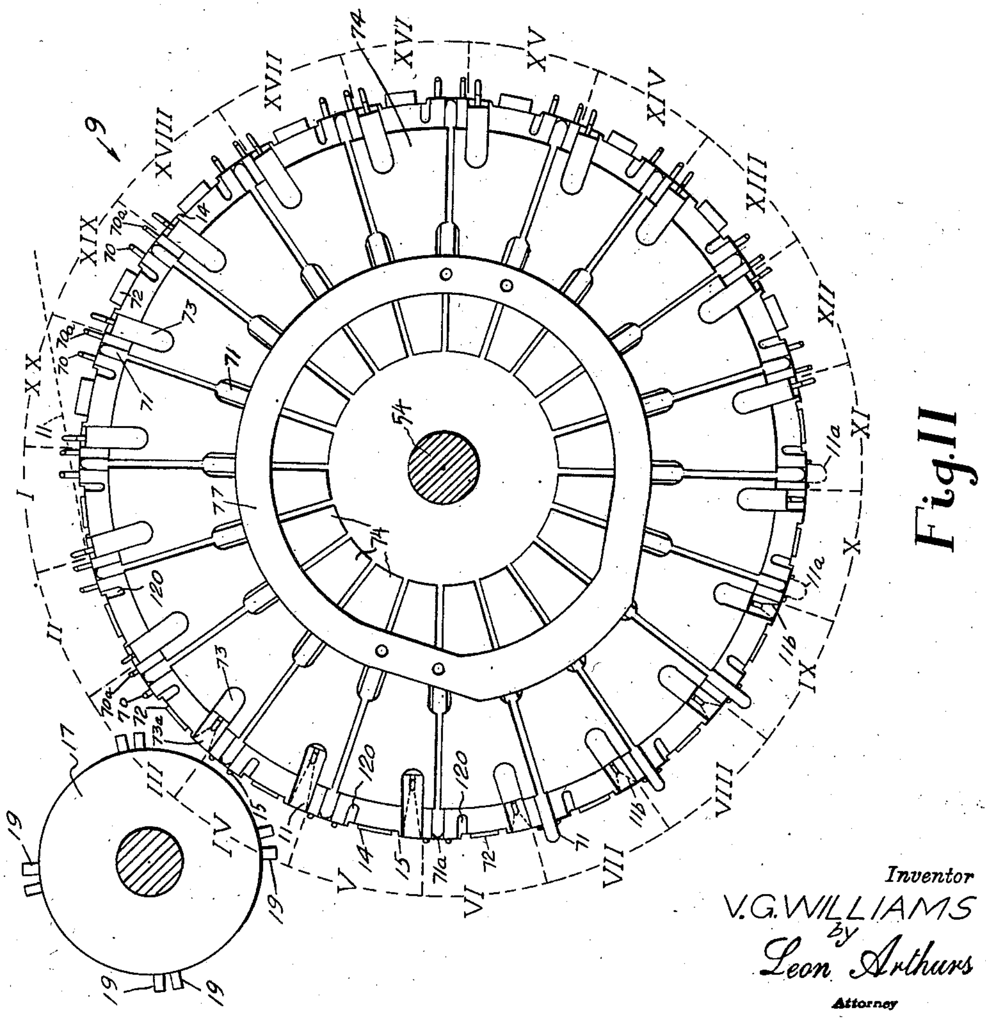
Figure 13:
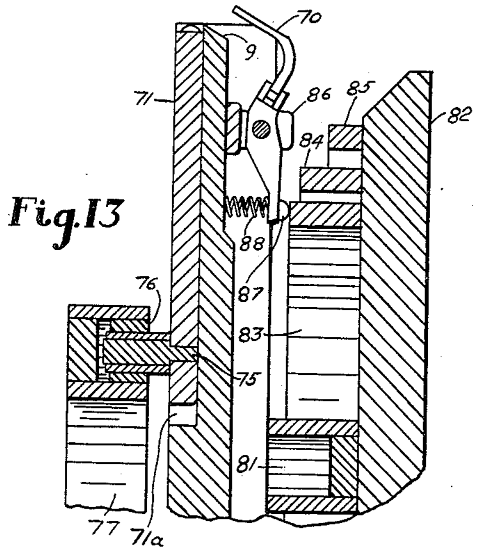
Figure 14:
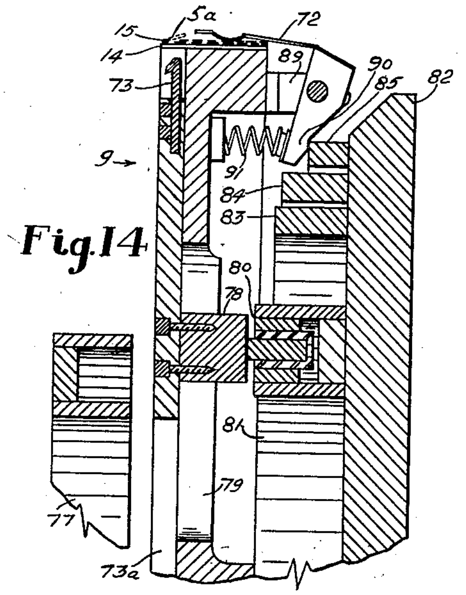
Figure 15:
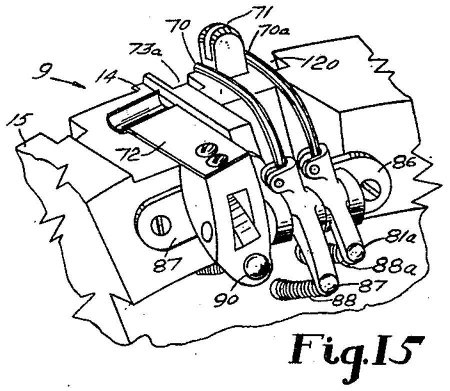
Figure 16:
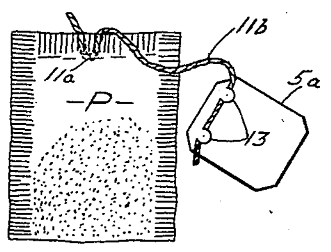
Figure 17:
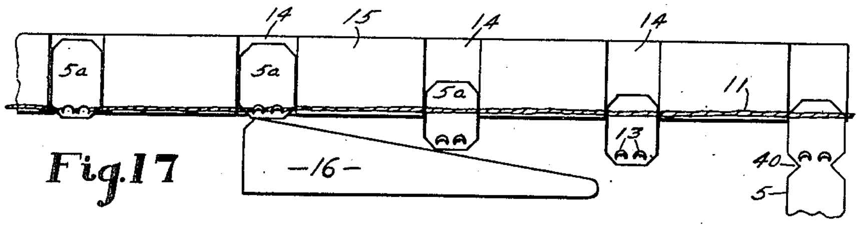
Figure 18:
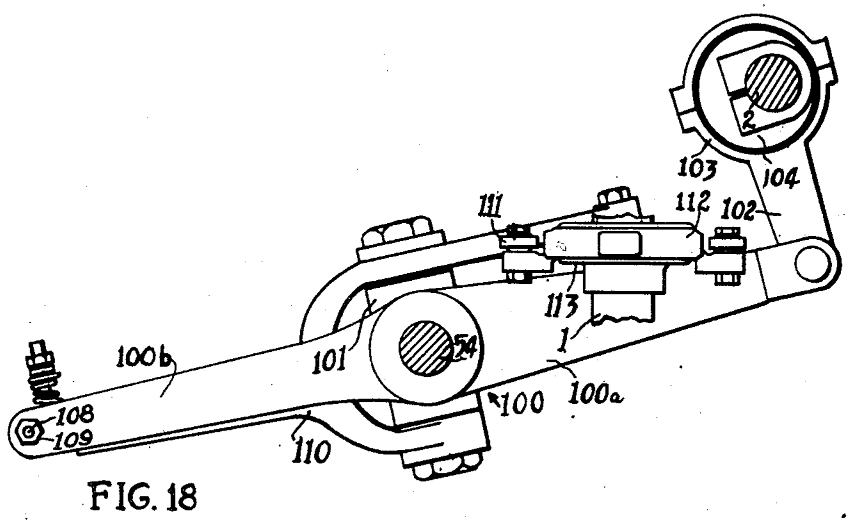
Figure 19:
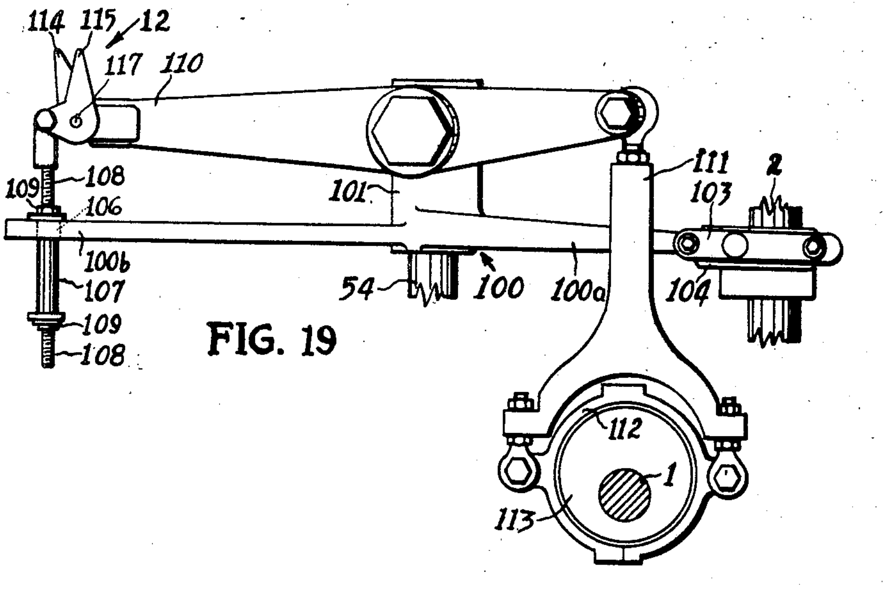
Figure 20:
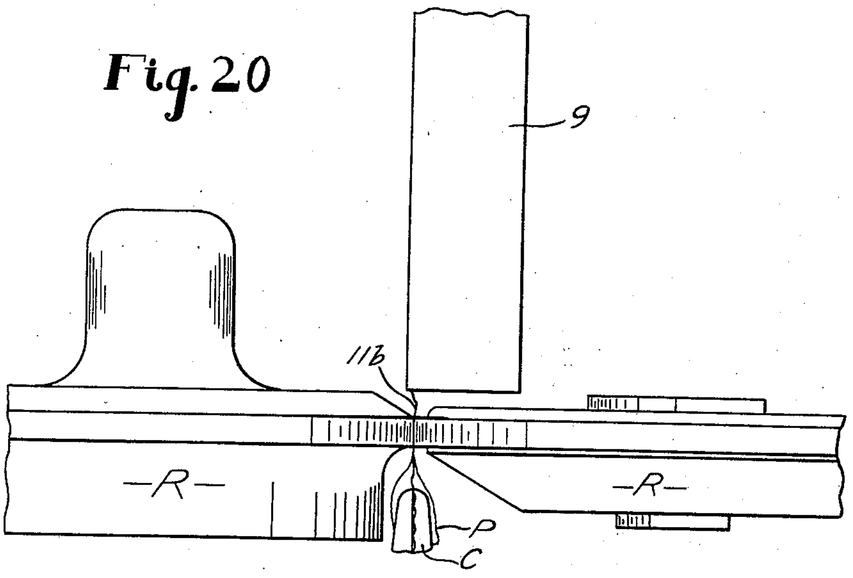
Figure 21:
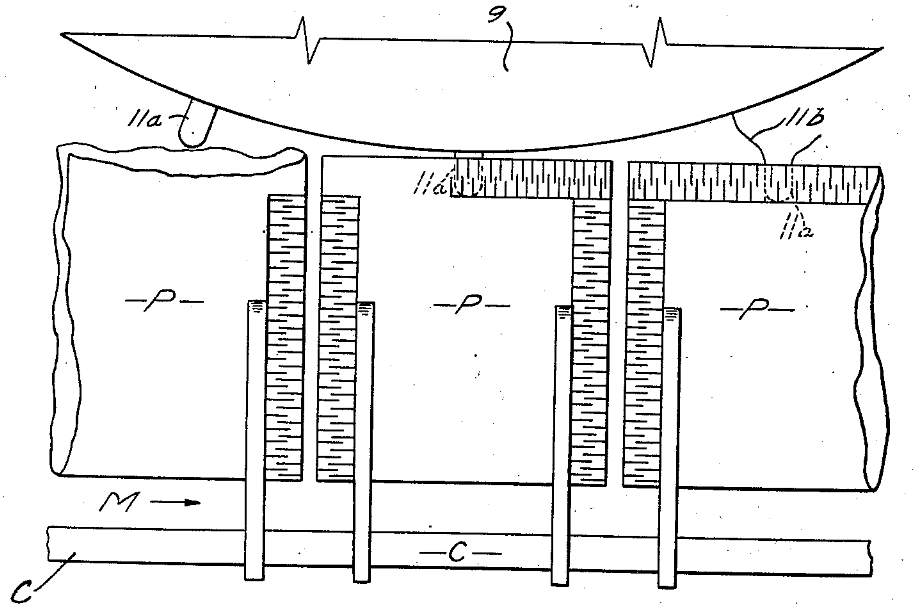

In addition to the broad objects previously outlined, other objects more or less broad than the foregoing will appear from the following description of the elements, parts and principles constituting the invention, a preferred embodiment whereof is illustrated, by way of example only, in the annexed drawing, wherein:

Fig. 1 is a view in front elevation of the present mechanism wherein certain parts are shown diagrammatically, Fig. 2—a plan view of a strip of tag material, Fig. 3—a plan view of a tag from which flaps have been displaced, Fig. 4—a view similar to Fig. 3 with the string in position across the tag, Fig. 5—a section along the line 5—5 in Fig. 3, Fig. 6—a section along the line 6—6 in Fig. 4, Fig. 7—a top plan view of the mechanism wherein certain parts have been broken away more clearly to reveal various features of the invention and wherein the other parts are shown diagrammatically, Fig. 8—a section along the line 8—8 in Fig. 7, Fig. 9—an enlarged view of a detail of Fig. 8, Fig. 10—a front elevational view of a portion of the tag cutting mechanism, Fig. 11—a partially diagrammatic front-elevational view of the tag conveying means, Fig. 12—an enlarged view of a portion of the mechanism shown in Fig. 11 from which certain parts have been removed, Fig. 13—a section along the line 13—13 in Fig. 12, Fig. 14—a section along the line 14—14 in Fig. 12, Fig. 15—a perspective view of a portion of the tag conveying mechanism, Fig. 16—a plan view of a package completed in accordance with the invention, Fig. 17—a diagrammatic view of a series of steps in the process of connecting the string and the tag, Fig. 18—a side-elevational view of the string cutting mechanism alone, Fig. 19—a plan view of the mechanism appearing in Fig. 18, and, Figs. 20 and 21—diagrammatic views showing the functional relationship between the basic machine and the present mechanism.

Throughout the drawings like reference numerals have been utilized to depict like parts.

It has already been pointed out that the basic machine is not properly a part of this invention. The inclusion of the specific details thereof in this specification would hence have only an unnecessary complicating effect. For a full realization of the advantages inherent in the instant apparatus, the conventional basic machine need only be capable of delivering a container to the present mechanism and of operating upon the said container after the handling string has been suitably positioned relative thereto. In addition, the structural details of the frame for the present attachment being, to some extent, dependent on the character of the basic machine, these too need only be referred to in general terms.

The method of powering the present attachment is another detail which does not appear to require undue elaboration, in view of the wide variety of well-known and efficient means optionally available for the purpose. What the present embodiment requires of the powering means is the vertical drive column 1, the horizontal driven shaft 2, and the gearing generically designated as 3 from which motion is imparted to the various elements of the apparatus as required thereby.

By way of preliminary summarization, the instant invention is provided with a flanged longitudinal chute 4 along which the series 5 of connected tags 5*a* is advanced in strip form by the pallet 6. At the source of the chute 4 there are reciprocably disposed, complementary, upper and lower dies 7 and 8 respectively, in vertical alignment with the tag series 5 which is sandwiched therebetween. At its mouth, the said chute 4 communicates axially with the rim of a carrier wheel 9. Interposed therebetween is the tag shear 10 which cuts the tag 5*a* from the series 5 in a manner to be subsequently described. Looped about the periphery of the wheel 9 is the string 11 which is adapted to be gripped, drawn to suitable length and prepared for attachment to the packages by means carried on the said wheel 9 which will also be more fully described hereinafter. The string shear 12, for cutting the string handles 11*b* from the string 11, is disposed at the side of the wheel 9.

In operation, which is of a substantially continuous and synchronized nature, one or more transversely aligned, peninsular flaps 13—13 are cut and offset from the leading tag 5*a*, to which, however, they remain attached by their necks 13*a*—13*a*. Advanced along the chute 4 by the pallet 6, the tag 5*a* is partially inserted into or engaged in a seat 14 on the rim 15 of the wheel 9. The tag shear 10 then, while following the rotation of the wheel 9 through a short arc, cuts the tag 5*a* from the series 5 and returns to its initial upright position, this being performed without interrupting or delaying the travel of the said wheel 9. The tag 5*a* is then carried past the deflector 16 and thereby pushed home into its seat 14, at which point the string 11 overlies the orifices 18—18 out of which the said flaps 13—13 were displaced and abuts, chord-wise, the neck 13*a* of each flap 13. Still in transit, the tag 5*a* is carried beneath a suitably disposed rotatory spider 17 which restores the flaps 13—13 to their orifices 18—18 by means of suitably spaced, paired, spurs 19 projecting radially therefrom. Further along the locus of the wheel 9, the string handle 11*b* is cut from the string 11 by the string shear 12 and is carried with the tag 5*a* to a point of convergence with the package P contemporaneously delivered thereto by the basic machine M.

The drawings reveal, and it should have been stated heretofore, that each flap 13 is at least semi-circular and preferably more than semi-circular in configuration. By this means, the danger of inadvertently raising the flaps 13—13 and of releasing the string handle 11*b* from its tag 5*a* is obviously notably decreased.

The foregoing having been presented by way of generalization, the various parts of the invention will now be more particularly described, seriatim, in substantially the same order in which they have been outlined above.

*The dies*

The male die 8 is situated below the plane of the chute 4 and adjacent the source thereof. It is comprised of the block 20, which is a part of the frame F, mounting a pair of chamfered, parallel, slideways 21—21 in spaced apart relation which slidably contain the correspondingly beveled spline 22. At its upper end, the spline 22 carries a boss 23 out of which a pair of spaced flap punches 24—24 project.

The female die 7 is substantially corresponsive to its counter-part, having the block 20*a*, slideways 21*a*—21*a*, spline 22*a*, boss 23*a*, and sockets 25—25 for the punches 24—24 with which they are aligned.

It being desirable in the operation of the dies 7 and 8 that they converge on the tag series 5 for punching purposes and thereafter diverge therefrom, they are linked together and motivated by the driven shaft 2 substantially as shown in Fig. 1 of the drawings. For this purpose, there is provided the compound lever 26, intermediately fulcrumed at 27 and joined by one of its ends to a link 28 swingably depending from the spline 22, its other end being joined to the lug 29 of the strap 30 which encircles the eccentric 31 mounted for rotation with the driven shaft 2. The female die 7 is reciprocated by the second-class lever 32 which is fulcrumed at 33 and attached to the spline 22*a* by the swingable link 34. A longitudinally adjustable connecting rod 35 joins the levers 26 and 32 from a point intermediate the fulcrum 27 and the lug 29 in the first instance to a point intermediate the fulcrum 33 and link 34 in the second instance.

One full turn of the eccentric 31 rocks the compound lever 26 on its fulcrum 27 to draw together the splines 22 and 22*a* for flap punching purposes, and to thereafter separate them. To ensure the release of the tag series 5 from the punches 24—24, there is provided, at the source of the chute 4, a stripper 36 consisting of a pair of spaced apart, edge-joined plates which are suitably apertured for penetration by the punches 24—24 and one of which is bracket-fastened to the rear of the block 20*a*.

*Tag forming and stringing mechanism*

Fig. 2 of the drawings illustrates the form of the tag series 5 contemplated by the present embodiment of the invention. It appears therein in strip form and carries regularly spaced lateral notches 40 which may be formed coincidentally with the printing thereof. The tag feeding pallet 6, which is slidable in the chute 4, is a cornuted member having wedge-shaped horns 41—41 at its head adapted, on forward motion, to mesh with the said notches 40 and to disengage therefrom on reverse motion. Through a slot 4*a* in the bottom of the chute 4 a longitudinally adjustable connecting rod 42 is pivotally attached by one of its ends, through suitable media, to the tail of the pallet 6. Its other end is joined, also pivotally, to one end of a lever 43 whose other end is swingably mounted on the frame F as at 44, the intermediate portion having a projection 45 into the grooved rim 46 of the barrel cam 47 which is mounted for rotation with the horizontal driven shaft 2.

One full turn of the barrel cam 47 oscillates the lever 43 inducing the horns 41—41 to engage in opposing notches 40—40 and advance the tag series 5 one pitch. The cycle is completed when the said horns 41—41 are retracted by the pallet 6 under the tag series 5, which is facilitated by their wedge-shaping, to the initial starting position and engaged in the next succeeding pair of notches 40—40.

It will be appreciated that with each advancement of the tag series 5, the leading tag 5*a* thereof will be partially inserted into the seat 14 provided on the rim 15 of the carrier wheel 9. To sever this portion from the series 5, there is provided the tag shear 10 which consists of fixed and movable blades 50—51, respectively. The fixed blade 50 is fastened to the top of an arm 52 whose lower end has a sleeve 53 mounted for independent rotation on the spindle 54 of the carrier wheel 9, the said top being substantially on a level with the chute 4. The movable blade 51 is pinned to the fixed blade 50 as at 49 and has a tail portion 55 held in a clevis 56 termination of a rod 57 having limited slidability and swingability through a bearing member 58 extending upwardly from the frame F. The intermediate portion of the arm 52 is pivotally joined by one end of a driving fork 59 whose prongs 60—60 embrace the sheave 61 which is mounted for rotation with the horizontal shaft 2 and which has a face cam flange 62 in which a projection 63 from the fork 59, is engaged.

It should have been stated that the source end of the chute 4 is attached to a flexible diaphragm 65 peripherally engaged by a hollow frusto-conical base 66 seated on the frame F and that its mouth end is swingably pinned to the top of the arm 52. It will be obvious that each single rotation of the sheave 61 and its flange 62 will thrust and retract the fork 59 and the attached arm 52 once. The tag sheer 10, fastened to the arm 52, will also travel therewith, the tail 55 of the blade 51 drawing the rod 57 through its bearing 58 until it is arrested by the hind stop nut 67 on the end of the said rod 57. The movable blade 51 is thus rocked to closing or shearing position which occurs while the tag series 5 is still contained between the cutting members of the tag shear 10. Once the tag 5*a* is detached from the tag material 5 and the arm 52 retracted to the upright starting position, the cycle is complete. It will be seen that with the return of the arm 52 to the upright position the rod 57 will be pushed back through its bearing 58 until it is arrested by the intermediate stop nut 68 whereby the movable blade 51 is rocked back into open position which it maintains until the next cycle.

*The carrier wheel*

Although the carrier wheel 9, per se, mounted on the spindle 54, is a self-contained element, it is divided into a plurality of identical independent operational stages, twenty in this instance, each whereof comprises, as a full complement, a pair of leading and following string grippers 70 and 70*a*, respectively, separated by the string loop former 71; a tag clamp 72, and a string hook 73, all of which are arranged radially of the said carrier wheel 9, substantially as shown particularly in Figs. 11 and 15 of the drawings. The drawings also illustrate the grooves 71*a* and 73*a* on the front face of the carrier wheel 9 wherein the said string loop former 71 and hook 73, respectively, are slidably contained, and the cover-plates 74 positioned thereover.

Fig. 13 which is a longitudinal section through the string loop former 71, with the cover-plate 74 removed, reveals the mode of its operation. Adjacent its lower end, it is provided with a forwardly projecting axle 75 on which a roller 76 is mounted for engagement in the stationary channel-form cam-ring, hereinafter referred to as the loop former cam 77, situated in front of the said carrier wheel 9. The string hook 73 also has an axle 78 which, however, is rearwardly directed through the slot 79 in the groove 73*a* and mounts the roller 80 engaged in the stationary channel-form cam ring, hereinafter referred to as the hook cam 81, at the back of the said carrier wheel 9. This, in turn, is backed by the stationary back-plate 82 which carries on its face a series of concentric, forwardly projecting cam rails 83, 84 and 85 of varying thicknesses respectively activating the string grippers 70 and 70*a*, and the tag clamp 72. The relationship between these parts is particularly shown in Figs. 13 and 14. Therein it will be seen that the leading string gripper 70 is a crank-shaped member rockably mounted on the bracket 86 fastened to the back of the carrier wheel 9 and has a tail portion 87 urged by the spring 88 against the cam rail 83; similar provision being made for the string gripper 70*a* in the form of the tail portion 87*a*, spring 88*a* and cam rail 84. The tag clamp 72 is also a right-angled member rockably mounted on a bracket 89 immediately behind the seat 14 on the rim 15 of the carrier wheel 9, and has a tail 90 maintained in contact with the cam rail 85, by means of the expansion spring 91.

It will be seen that the movements of the string loop former 71 and the hook 73 in their respective grooves will vary according to the undulations of their respective cams 77 and 81; whereas the rocking of the grippers 70—70a and tag clamp 72 will be in response to the undulations in the cam rails 83, 84 and 85 respectively.

*The string shear*

As in the case of the tag shear 10, the string shear 12 is designed, during its cutting cycle, to follow the carrier wheel 9 through a short arc in order not to interrupt or delay the operation thereof.

Moreover, being normally maintained in open porition at a necessarily short distance therefrom, it is important that the said string shear 12 approach the carrier wheel 9 for string cutting purposes and thereafter retreat therefrom. The compound motion required as a result is provided by the means particularly shown in Figs. 18 and 19 of the drawings. These means consist of the lever 100 having an intermediate fulcrum sleeve 101 mounted on but not keyed to the spindle 54. One arm 100a of the lever 100 is joined to the lug 102 of the strap 103 about the eccentric wheel 104 mounted for rotation with the driven shaft 2. The other arm 100b of the lever 100 has, at its extremity, an aperture 106 in which there is loosely accommodated the intermediate portion 107 of a stem 108 as defined by the spaced apart stop nuts 109—109. The string shear 12, per se, being attached to the end of the said stem 108, it will be seen that each single rotation of the eccentric wheel 104 will produce one down-and-up cycle of the stem 108 and of the thereto attached string shear 12 for the purpose of following the carrier wheel 9. The approach and retreat of the cutting mechanism with respect to the said carrier wheel 9 is achieved by means of the lever 110 which is fastened for swingability, in a substantially horizontal plane, to the sleeve 101. One end thereof is universal-jointed to the end of a connecting rod 111 motivated by the strap 112 encircling the eccentric 113 mounted on the vertical driven shaft 1. Still paralleling the structure of the tag shear 10, the string shear 12 consists of fixed and movable blades 114 and 115 respectively; the fixed blade 114 being attached to the free end of the lever 110 and being joined to the movable blade 115 by pin 117, the said movable blade 115 being pivotally attached to the end of the stem 108. It will be appreciated that as the cutting mechanism is urged towards the string 11, the stem 108 will be drawn through the aperture 106 until it is arrested by the rear stop nut 109 at which time the continued swinging of the lever 110, still urging the fixed blade 114 towards the carrier wheel 9, will cause the movable blade 115 to turn on its pivot pin 117 and close against the said fixed blade 114 when the string 11 is contained therebetween.

*Operation*

It has already been explained that in its present embodiment, the carrier wheel 9 is the vehicle for 20 complete, regularly spaced, sets of cam-operated parts and that the cam-activation thereof is induced by the rotation of the said carrier wheel 9. To facilitate this summarization of the process whereby the string 11 is secured to the tag 5a and is readied for attachment to the package P, in Fig. 11 of the drawings there are defined, by the dash lines and Roman numerals, 20 stations through which each of the said parts must successively pass on a single rotation of the carrier wheel 9.

After the leading tag 5a has been partially introduced into one of the seats 14 on the rim 15 of the carrier wheel 9 at station I, it is severed from the series 5 and pushed home into the said seat 14 by means of the deflector 16 in the manner previously described and illustrated schematically in Fig. 17. As has also been already stated, when the tag 5a is thus deflected, it assumes the position relative to the string 11, illustrated in Figs. 4 and 6 of the drawings wherein the said string 11 is shown as lying chord-wise of the flaps 13—13. With further reference to Fig. 11 the foregoing action takes place between stations I and III; in the former whereof the tag clamp 72 is dropped by its cam-rail 85 to tag-retaining position and in the latter, the hook 73, as shown, begins its centripetal movement with the string 11. Once the said string hook 73 has attained its maximum depth, the string grippers 70—70a are dropped on the string 11 to prevent further longitudinal movement thereof and the rotating spider 17, through its spurs 19, replaces the flaps 13—13 into their orifices 18—18, this action taking place between stations III and IV.

To form the string loop 11a for affiliation with the package P, while still at station VI, the string hook 73 is moved half-way out and, as shown at station VII, the following string gripper 70a relaxes its hold on the string 11 co-incidentally with the outward movement of the loop former 71 to pick up the string slack. By the time station VIII is reached, the said loop former 71 will have been completely extruded, the string gripper 70a restored to retaining position, and the string 11 cut. At station X the loop former 71 is completely retracted, exposing the string loop 11a still held by the grippers 70—70a, and the hook 73 is almost completely extruded. It is after the next succeeding station XI that the said string loop 11a meets with, enters, and is secured to the mouth of the package P with which it is thereafter carried away, the string handle 11b being released by the grippers 70—70a and the tag 5a released by the tag clamp 72 for this purpose. The positions of the parts shown at station XII are so maintained until their return to station I at the beginning of the next cycle.

Fig. 11 also illustrates the pits 120 in the front edge of the carrier wheel 9. It will be recalled that the string shear 12 is moved towards the string 11 in order to cut it. This action occurs roughly between stages VII and VIII, the points of the blades 114 and 115 entering the said pit 120 for this purpose.

From Figs. 20 and 21 the method contemplated for securing the tag 5a to the package P is particularly disclosed.

Therein it will be seen that the package conveyor C is disposed tangentially of the carrier wheel 9; being so spaced with respect thereto that the packages P are conveyed along a line lying in the vertical plane of the loop former 71 at a measured distance below the carrier wheel 9. While the projecting string loop 11a passes through station XI it is met by the open mouth of the package P which it enters. The said package P then continues between the pair of heated sealing rollers RR which seal its mouth with the string loop 11a contained thereby. Thereafter, as has already been stated, the tag 5a and string handle 11b are freed to be carried away with the said package P.

It should be noted that, at its string engaging crest, the loop former 71 is curved and that the string grippers 70—70a are situated immediately adjacent thereto. By these means, an extended semi-circular or hairpin configuration is imparted to the loop 11a which is of particular utility in the achievement of a firm bond between the string handle 11b and package P.

Although it has already been stated that the present invention is superior to the prior art by virtue of the speed at which it delivers tags prepared for attachment to the packages, the positive and efficient manner in which it performs its functions also merits attention.

As one example thereof reference may be had to the method visualized by the invention for securing the strings to the tags. Besides its evident advantages over the older method of stitching or stapling, and over the method of knotting or tying the strings, it also enables the substitution of simple and inexpensive tongue punching and replacing means for the sewing machine head or other costly and complicated machinery which was heretofore required for the purpose. In addition, it should be observed that by moving the tag toward the relatively stationary stretched string, instead of vice versa, the sensitive equipment normally required for guiding and feeding the string is rendered unnecessary. Similarly the principle of forming a narrow loop by which the string is attached to the package is also noteworthy. Were it a rectilineal, or even a slightly curved, instead of a looped attachment, it is obvious that very little strain would be required to pull the string through the channel formed thereabout by the package material. Moreover, by gripping the string on each side of the loop a degree of stiffness is imparted thereto which considerably facilitates its entry into the open mouth of the package.

Inasmuch as the foregoing description and the annexed drawings are confined to one embodiment of the invention only, it should be clear that the invention may be embodied in numerous other forms within the scope of the following claims.

What I claim as my invention is:

1. Mechanism for providing a stringed tag for a package of the character described including a carrier; a chute communicating therewith; means to advance a series of connected tags along the said chute and to engage one of the tags on the said carrier; means to oscillate the said chute to permit the engagement of the said tag on the carrier while it is in motion; a shear co-operating with the said carrier and tag advancement means for severing the said tag from the series, and means to secure string to the said tag.

2. Mechanism for providing individual stringed tags in a continuous series including means for displacing a flap from a tag; a carrier having string associated therewith; means for feeding a connected series of tags through the said flap displacement means and for engaging successive tags on successive portions of the said carrier; means for severing each tag from the said series as it engages on the said carrier; means for seating the tags on the said carrier in juxtaposed relation to the string; means provided on the said carrier for gripping the string; means for lengthening the string between tags; means for delaying the gripping of the string pending the lengthening thereof; means for restoring each flap to predisplacement, string-retaining position, and means to cut the string between adjacent tags.

3. Mechanism for providing individual stringed tags in a continuous series including means for displacing a flap from a tag; a carrier having string associated therewith; means for feeding a connected series of tags through the said flap displacement means and for engaging successive tags on successive portions of the said carrier; means for severing each tag from the said series as it engages on the said carrier; means for seating the tags on the said carrier in juxtaposed relation to the string; means for gripping the string provided on the said carrier; means for restoring each flap to predisplacement, string-retaining, position; means for forming loops in the string intermediate the tags; means for relaxing the gripping of the said string pending the looping thereof, and means to cut the string between the tags.

4. Mechanism for providing a stringed tag for a package of the character described including, die means for cutting and folding a flap from a tag along an uncut fold line, means for holding a length of string, a positioning member for feeding a tag to and past said die means and for juxtaposing the said tag adjacent an intermediate portion of string with said string extending thereacross between said flap and a face of said tag, and means to restore the said flap to predisplacement string-retaining position.

5. Mechanism for providing a stringed tag for a package of the character described including, a constantly moving carrier; a chute having a mouth in communication therewith and adjacent said carrier; means to advance a tag along and from the the chute to the said carrier and to engage it thereon, the mouth of the said chute being movable in the direction of movement of the carrier, means for moving said mouth to follow the said carrier during the engagement of the said tag thereon in order not to interrupt the motion thereof, and means to secure string to the said tag while on said carrier.

6. Mechanism for providing a stringed tag for a package of the character described including a movable carrier; a chute communicating therewith; means to advance a series of connected tags along the said chute and to engage the leading tag on a seat on the said carrier; a shear for severing the said tag from the said series and comprising relatively movable jaws openly disposed at the mouth of the said chute for passage of said tags therebetween, the mouth of the said chute being movable to follow the said carrier during the engagement of said tag on said seat and severing of the said tag; means operable in timed relation to movement of said chute to close the said shear jaws after engagement of the said tag on the said seat, and means to secure string to the said tag.

7. Mechanism for providing a stringed tag for a package of the character described including means for securing string to a tag; a carrier for the said tag and attached string; a shear for cutting the string at a predetermined distance from the said tag, and means carried by the said carrier for forming an unsupported loop at the cut end of the said string with said loop extending outwardly of said carrier.

8. Mechanism for providing a stringed tag for a package of the character described including means for securing string to a tag; a continuously movable carrier for the tag and string; a single separate shear for cutting the string, and means for periodically bodily moving the said shear in the direction of movement of the said carrier and to approach the carrier and engage and cut said string thereon at successive spaced points.

9. In tagging mechanism for association with a basic machine for making, delivering, and operating upon packages in continuous series, the combination which includes means for forming string handles in connected series; a movable carrier therefor; means for forming outwardly projecting unsupported loops therein; means for gripping said string adjacent said loops to said carrier for maintaining the said loops in projection from the said carrier; means operable in timed relation to movement of said carrier for dividing the said connected series into individual string handles, each having its own loop; the said carrier being thereafter movable into position to juxtapose successive loops relative to successive packages which are thereafter subject to be operated upon by the said basic machine to secure the said loops to their respective packages.

10. The method of providing packages of the character described with string handles in continuous series, which includes the steps of seating tags in spaced apart relation on a carrier provided with substantially taut string, providing slack in the string between the tags, forming outwardly projecting free loops with the said slack string between the tags, forming individual string handles by cutting the string between the tags adjacent said loops, moving said carrier to juxtapose successive loops relative to successive packages, and securing said loops to said packages.

VICTOR GEORGE WILLIAMS.

REFERENCES CITED

The following references are of record in the file of this patent:

UNITED STATES PATENTS

| Number | Name | Date |
|---|---|---|
| 235,518 | Lany | Dec. 14, 1880 |
| 1,642,307 | Ovington | Sept. 13, 1927 |
| 1,841,911 | Pierce | Jan. 19, 1932 |
| 1,888,704 | Swett | Nov. 22, 1932 |
| 2,248,145 | Wilder | July 8, 1941 |
| 2,334,256 | Eaton | Nov. 16, 1943 |
| 2,360,510 | Murray | Oct. 17, 1944 |
| 2,382,778 | Dalton | Aug. 14, 1945 |